Patented Mar. 30, 1954

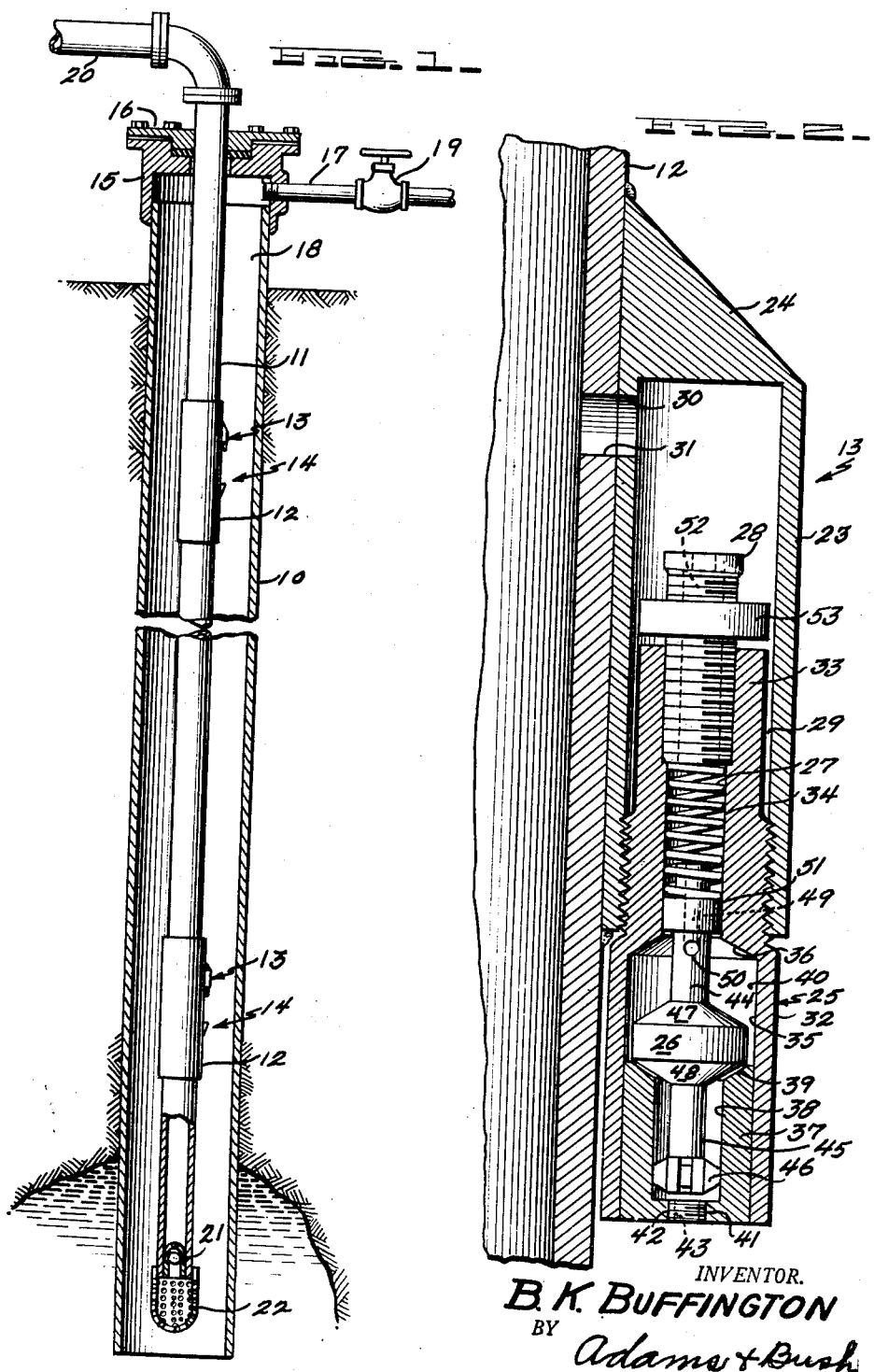

2,673,568

UNITED STATES PATENT OFFICE 2,673,568

FLOW VALVE ASSEMBLY

Bernard K. Buffington, San Antonio, Tex.

Application January 11, 1949, Serial No. 70,280

3 Claims. (Cl. 137—155)

This invention relates to oil well flowing apparatus and has more particular reference to flow valves of the type used in such apparatus.

One object of the present invention is to provide an improved and novel flow valve assembly including a housing adapted to be externally mounted on a section of flow tubing with a radial port in the housing communicating with a radial port in the tubing and a double acting flow valve removably mounted in the housing for admitting gas or air under pressure into the column of liquid in the flow tubing to effect its elevation.

Another object of the invention is to provide a flow valve assembly as above characterized, in which the valve is opened and closed in two opposite directions by a single moving part to permit the entry of the gas or air into the tubing and to prevent liquid from bleeding back through the valve.

Another object of the invention is to provide a flow valve assembly as above characterized, including a differential compression spring adapted to normally close the valve in one direction and means for adjusting the compression of the spring.

Another object of the invention is to provide a flow valve assembly as above characterized, in which means are provided to throttle the movement of the valve as it moves to shut off the flow of air or gas therethrough.

Another object of the invention is to provide a nipple adapted to form a part of the well flow tubing mounted in the well casing, and having a valve assembly as above characterized, mounted thereon and carrying a guard lug rigidly secured thereto and positioned below and in vertical alignment with the valve housing to protect the valve as the nipple is lowered and raised in the well casing.

A further object of the invention is to provide a flow valve assembly which is simple and rugged in construction, has only one moving part, and is efficient in operation.

Other objects and advantages of the invention will appear in the following specification when considered in connection with the accompanying drawing, wherein:

Fig. 1 is a vertical sectional view of an oil well casing showing the eduction tubing partly in section and the manner in which flow valves constructed in accordance with the present invention are mounted on the eduction tubing; and Fig. 2 is an enlarged vertical cross section of a flow valve constructed in accordance with the present invention.

In the art of producing oil from oil wells it has become the common practice to aid the movement of the oil from the formation to the surface in wells which do not have sufficient bottom hole pressure to flow themselves, by injecting air or gas under pressure into the oil at various points along the flow tubing to aerate it and cause it to flow out the top of the well.

The present invention provides a novel and improved flow valve assembly for admitting air or gas under pressure from the casing annulus of an oil well into the flow tubing.

In general, the flow valve assembly comprises a hollow cylindrical housing open at its lower end; a valve cylinder removably mounted in the housing; a double acting valve mounted within the cylinder and adapted to open and close in two opposite directions to permit air or gas under pressure to flow from the casing annulus into the flow tubing and to prevent any liquid from bleeding back into the casing annulus; and a guard lug mounted on the flow tubing below and in vertical alignment with the housing to prevent injury to the valve as the tubing is raised or lowered in the well casing. Preferably, the valve housing and the guard lug are rigidly mounted on the external surface of a nipple adapted to form part of the flow tubing.

Referring now to the drawing, there is shown, in Fig. 1, an oil well comprising a welded casing 10 which, as usual, may be formed from aligned pipe sections of suitable diameter and length, and arranged to extend from the ground surface of the well to the oil producing subterranean strata; an axially positioned flow line or eduction tubing 11 formed of pipe sections of suitable length united at intervals and possessing a diameter materially less than that of the casing 10; and a plurality of coupling sections or nipples 12 mounted in the flow line or tubing, each of such sections carrying a flow valve 13 and a guard lug 14.

The top of the casing 10 is shown as being provided with a conventional casing head 15, closed by a combined cover plate and gland 16 which compresses packing into contact with the flow tubing 11 to form a fluid-tight seal between the casing head and the flow tubing. Connected to the casing head 15 is a pressure line 17 adapted to conduct air or gas under pressure into the casing annulus indicated at 18. A control valve 19 and other suitable means (not shown) are employed for controlling the flow of gas or air under pressure into the casing annulus.

The upper end of the flow tubing 11 terminates in a discharge line 20 through which the elevated liquid may be delivered to a selected point. The bottom end of the flow tubing is provided with the usual check valve 21 and screen 22. The coupling sections or nipples 12 are secured in the flow tubing at selected intervals, approximately every three hundred feet. The couplings are identical in construction, each being internally threaded at each end and each carries a flow valve 13 and a guard lug 14.

The details of the flow valve assembly are shown in Fig. 2. As there shown, the valve comprises a cylindrical valve housing 23 having an integral conically shaped upper lug portions or cap 24; a valve cylinder 25 detachably mounted in the housing; a double acting valve 26 mounted in the valve cylinder; a differential compression spring 27 normally holding the valve 26 seated on its lower seat; and a cap screw 28 for adjusting the compression of the differential spring.

The housing 23 and its integral lug portion 24 are secured to the outer surface of the coupling 12, as by welding. The housing is provided with a bottom opening cylindrical recess 29 for reception of the valve cylinder 25. The lower end of the recess 29 is internally threaded and the upper end is provided with a radial opening or port 30 which is in alignment and communicates with a radial opening or port 31 formed in the wall of the coupling. The valve cylinder 25 has a lower portion 32 in which is mounted the double acting valve 26, and a reduced upper portion 33 which extends into the valve housing and is externally threaded at its lower end for engagement with the internal threads in the lower end of the valve housing recess 29. The valve cylinder 25 is provided with a top opening upper bore 34 which communicates and is aligned with a bottom opening lower bore 35. The diameter of the lower bore 35 is considerably larger than the diameter of the upper bore 34 and the internal side walls of the cylinder at the juncture of the two bores are beveled to form an upper valve seat 36.

A sleeve 37 having a closed bottom end and a top opening cylindrical recess 38 is machine fitted in the lower portion of the bore 35. The tops of the walls of the sleeve are bevelled to form a lower valve seat 39; the space between the upper and lower valve seats forming the valve chamber 40. An internally threaded opening 41 is formed in the closed bottom end of the sleeve 37 and receives an externally threaded orifice member 42 having a bore 43 of a predetermined diameter.

The double acting valve 26 is mounted in the valve chamber 40 and has an integral upper valve stem 44 extending upwardly into the upper bore 34 of the valve cylinder and an integral lower valve stem 45 extending downwardly into the cylindrical recess 38 in the sleeve 37. The lower stem 45 is provided with circumferentially spaced guide vanes 46 which engage the side walls of the recess 38 as the valve moves up and down and provide gas passages between the vanes. The valve 36 has its top and bottom surfaces bevelled to form upper and lower valve faces 47, 48 adapted to seat against the upper valve seat 36 and the lower valve seat 39, respectively. The upper valve stem 44 has a cylindrical recess 49 extending downwardly from the top of the stem to and communicating with a radial opening or port 50 in the stem positioned above the upper valve face 47 and has a piston guide collar 51 formed thereon which engages the side walls of the upper bore 34 of the valve cylinder. The differential coiled spring 27 is mounted in the upper bore 34 of the valve cylinder with its bottom end resting on the collar 51 on the upper valve stem. The cap screw 28 is threadedly mounted within the upper portion of the upper bore 34 of the valve cylinder with its lower end engaging the top of the differential spring 27. The cap screw 28 is provided with an open ended bore 52 and is held in adjusted position by means of a lock ring 53.

The operation of the flow valve is as follows:

The downward pressure of the differential spring 27, plus the pressure of the static fluid column within the flow tubing 11 (which exerts its pressure through port 31 and down through ports 30, 52 and 50 against the upper face 47 of the valve 26) normally maintains the valve 26 seated on its lower valve seat 39. In order to open the valve, the gas or air pressure within the casing annulus 18 must be of a force greater than the fluid load plus the differential spring pressure. In order to accomplish this, gas or air pressure is turned into the casing annulus. When this gas or air pressure (which enters the cylinder through the port 43 in the orifice member 42 in the bottom of the sleeve 37) exerts itself through the guide vane ports or passages against the lower valve face 48 of the valve 26, the valve moves upward off of its lower seat. Once the valve has been moved off of its lower seat, gas or air will pass upward around the valve body, and exert its pressure against the bottom shoulder of the guide collar 51, as well as through the ports 50, 52, 30 and 31, and into the flow tubing 11. The port 50 is made smaller in area than any other gas or air passage below it so that the valve body will move slowly to its extreme upper seating position, while the gas or air is passing up around it and through ports 50, 52, 30 and 31 into the flow tubing and aerating the fluid column inside the tubing, thus having a throttling effect on the upward movement of the valve 26. When the fluid column on the inside of the tubing string is lightened by aeration and is moving upward, the pressure on the bottom side of the valve being greater, this pressure closes the valve upward, and no gas or air can pass through it into the tubing string until a static fluid column inside the tubing plus the differential spring pressure opens it to gas or air pressure again.

From the foregoing, it readily will be seen that there has been provided a novel and improved flow valve assembly which is simple in construction, rugged, easy to remove and install, and efficient in operation. Due to the valve being mounted on the external surface of the nipple or a section of the flow tubing, the bore of the flow tubing is unobstructed. The valve housing and the guard lug prevent the valve from being injured when being lowered or raised inside the well casing. The valve cylinder being removably mounted in the housing, is readily removed to permit adjusting the compression of the differential spring by adjusting the cap screw.

Obviously, the invention is not restricted to the particular embodiment thereof herein shown and described. Moreover, it is not indispensable that all of the features of the invention be used conjointly, since they may be employed advantageously in various combinations and sub-combinations.

Having thus described the invention, what is claimed is:

1. A flow valve assembly adapted to control the flow of fluid therethrough and adapted to be mounted on a section of flow tubing provided with a radial port, and comprising a housing having a cylindrical recess open at one end and closed at the other end and provided with a radial discharge port adjacent the closed end for communication with the port in the flow section; an open ended valve cylinder detachably mounted in said housing with one end portion extending into said recess, the open end of the other end portion constituting the inlet port of the entire flow valve assembly, said cylinder having a valve chamber formed therein and having first and second annular valve seats at opposite ends of said valve chamber; a double acting valve mounted in said chamber between said seats, said valve being of less diameter than said chamber to permit passage of gas around its body and having a stem extending into said one end portion of the valve cylinder, said stem having a passageway formed therein to permit communication between said one end portion of the cylinder and the valve chamber when the valve is off the seat adjacent said one end portion; and an adjustable differential spring means engaging said stem to normally maintain said valve on the seat remote from said one end portion.

2. A flow valve assembly as set forth in claim 1, wherein the internal diameter of said one end portion of the valve cylinder which receives the valve stem is less than the diameter of the valve chamber and wherein the valve stem is provided with a collar forming a piston intermediate its ends which slidably engages the internal wall of the reduced portion of the valve cylinder.

3. A flow valve assembly adapted to be mounted on a section of flow tubing provided with a radial port, and comprising a housing having a bottom opening cylindrical recess provided with a radial port adjacent its upper end for communication with the port in the flow section; an open ended valve cylinder detachably mounted in said housing with its upper end portion extending into said recess, said cylinder having a valve chamber formed therein and having upper and lower annular valve seats; a double acting valve mounted in said chamber between said seats, said valve being of less diameter than said chamber to permit passage of gas around its body and having a stem extending into the upper portion of the valve cylinder, said stem having a passageway formed therein to permit communication between the upper portion of the cylinder and the valve chamber when the valve is off its upper seat; an adjustable differential spring mounted in the upper end of the valve cylinder and engaging said valve stem to normally maintain said valve on its lower seat; and a cap screw provided with a longitudinal open ended bore threadedly mounted in the upper end of said valve cylinder with its lower end engaging the upper end of said spring for adjusting the compression of said spring.

BERNARD K. BUFFINGTON.

References Cited in the file of this patent
UNITED STATES PATENTS

| Number | Name | Date |
|---|---|---|
| 1,310,615 | Greenlee | July 22, 1919 |
| 1,882,060 | Boynton | Oct. 11, 1932 |
| 1,918,891 | Barrett | July 18, 1933 |
| 2,144,833 | Crickmer | Jan. 14, 1939 |
| 2,204,834 | Temple | June 18, 1940 |
| 2,210,247 | Kyner | Aug. 6, 1940 |
| 2,256,704 | Crickmer | Sept. 23, 1941 |
| 2,323,893 | Boynton | July 13, 1943 |
| 2,366,175 | Boynton | Jan. 2, 1945 |
| 2,588,715 | Garrett | Mar. 11, 1952 |